US010284430B2

United States Patent
Nayak et al.

(10) Patent No.: US 10,284,430 B2
(45) Date of Patent: May 7, 2019

(54) STORAGE PROVISIONING AND CONFIGURATION OF NETWORK PROTOCOL PARAMETERS

(71) Applicant: VMware, Inc., Palo Alto, CA (US)

(72) Inventors: Samdeep Nayak, Sunnyvale, CA (US); Chiao-Chuan Shih, San Jose, CA (US); Sanjay Vasudev Acharya, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 182 days.

(21) Appl. No.: 14/964,411

(22) Filed: Dec. 9, 2015

(65) Prior Publication Data
US 2017/0171019 A1    Jun. 15, 2017

(51) Int. Cl.
| | |
|---|---|
| G06F 15/173 | (2006.01) |
| H04L 12/24 | (2006.01) |
| G06F 9/50 | (2006.01) |
| G06F 17/30 | (2006.01) |
| G06F 3/06 | (2006.01) |
| H04L 29/08 | (2006.01) |
| H04L 12/931 | (2013.01) |
| H04L 29/12 | (2006.01) |

(52) U.S. Cl.
CPC ............ *H04L 41/12* (2013.01); *G06F 3/0607* (2013.01); *G06F 9/5077* (2013.01); *G06F 17/30082* (2013.01); *H04L 41/0803* (2013.01); *H04L 49/357* (2013.01); *H04L 61/2038* (2013.01); *H04L 67/1097* (2013.01); *H04L 69/324* (2013.01)

(58) Field of Classification Search
CPC ..... H04L 41/12; G06F 9/5077; G06F 3/0607; G06F 17/30082
USPC ......................... 709/224, 225, 223
See application file for complete search history.

(56) References Cited

U.S. PATENT DOCUMENTS 7,706,393 B2    4/2010    Hill
9,948,566 B2    4/2018    Nayak et al.
(Continued)

OTHER PUBLICATIONS

Non-final Office Action from U.S. Appl. No. 14/964,425, dated May 18, 2017, 17 pages.
(Continued)

*Primary Examiner* — Kyung H Shin
(74) *Attorney, Agent, or Firm* — Fish & Richardson P.C.

(57) ABSTRACT

Exemplary methods, apparatuses, and systems include a management server receiving, from each of a plurality of switches, physical topology data of network nodes. The physical topology data includes identifiers of hosts connected to each of the switches and identifiers of storage connected to each of the switches. The management server transmits a query to each of the network nodes and receives, in response to each query, the capabilities of each network node. In response to receiving a request to create a cluster of the hosts, the management server selects hosts and storage from the physical topology data to create the cluster. The hosts and storage are selected based upon the capabilities received from each network node. The management server determines transport protocol login service parameters based upon the received storage capabilities and transmits the parameters to one or more of the plurality of switches, hosts, and storage.

22 Claims, 5 Drawing Sheets

(56) References Cited

U.S. PATENT DOCUMENTS

| | | | |
|---|---|---|---|
| 2003/0182422 A1* | 9/2003 | Bradshaw | G06F 17/30082 |
| | | | 709/225 |
| 2006/0230218 A1* | 10/2006 | Warren | G06F 3/0607 |
| | | | 710/315 |
| 2010/0091658 A1* | 4/2010 | Nguyen | H04L 67/1097 |
| | | | 370/241 |
| 2010/0128605 A1 | 5/2010 | Chavan et al. | |
| 2012/0317270 A1 | 12/2012 | Vrbaski et al. | |
| 2013/0163607 A1* | 6/2013 | Shukla | H04L 49/357 |
| | | | 370/419 |
| 2015/0113529 A1* | 4/2015 | Zhong | G06F 9/5077 |
| | | | 718/1 |
| 2016/0014631 A1 | 1/2016 | Wang et al. | |
| 2016/0127191 A1* | 5/2016 | Nair | H04L 41/12 |
| | | | 709/224 |

OTHER PUBLICATIONS

FCoE Initiation Protocol, Cisco Nexus 5000 Series Switches, downloaded on Oct. 2, 2015, at: http://www.cisco.com/c/en/us/products/collateral/switches/nexus-7000-series-switches/white_paper_c11-560403.html, 9 pages.

VMware High Availability, Concepts, Implementation, and Best Practices, White Paper, VMware, Inc., 2007, 29 pages.

\* cited by examiner

STORAGE PROVISIONING AND CONFIGURATION OF NETWORK PROTOCOL PARAMETERS

FIELD OF INVENTION

The various embodiments described in this document relate to deploying and managing a cluster of network nodes. In particular, embodiments include a management server selecting network nodes for the cluster and programming the selected network nodes to define network paths and communication protocol parameters. Additionally, embodiments include a management server receiving congestion indications from a switch, identifying one or more hosts running contributors to the congestion, and selectively throttling traffic within the identified hosts.

BACKGROUND OF THE INVENTION

In a virtual data center environment, data compute nodes (e.g., virtual machines) may be deployed in a cluster. A cluster includes a number of network nodes, including hosts to run the data compute nodes. In one embodiment, the cluster includes or is otherwise associated with switches to handle storage, local, and wide-area network traffic, and storage for the data compute nodes. The deployment and management of such a cluster includes making sure the storage is accessible by the hosts. For example, an administrator creates a unique initiator identifier for each host and sets up various parameters that will be used by the host for protocol negotiation. Similarly, an administrator creates a unique target identifier for each storage and sets up various parameters that will be used by the storage for the protocol negotiation. The hosts discover storage targets by querying a name server (e.g., within a switch) and negotiate parameters for use in a session established between hosts and storage. For example, the negotiation between a host and storage may include the host transmitting transport protocol login service parameter values for queue depth, encryption, etc. to storage and storage responding with corresponding parameter values supported by storage. As such, the deployment and management of a cluster requires a significant amount of manual configuration followed by potentially heavy network traffic (e.g., in a large deployment) during the bidirectional communications of the negotiation of parameters.

Additionally, network nodes within a cluster may be configured for replication to a disaster recovery data center. For example, applications running within the cluster configured for replication have write commands that are directed to primary storage copied and sent over a wide area network (WAN) to storage within the disaster recovery data center. Consequently, WAN bandwidth between primary and disaster recovery data centers is important to ensure data is copied to the data recovery site. WAN bandwidth, however, is expensive and can become congested. To handle congestion, a switch may transmit a pause frame to one or more network nodes at the previous hop. The pause frame is pushed to initiators directly or indirectly connected to the switch, causing all initiators to pause or stop sending input/output (I/O) traffic. As a result, a single or minority of applications or data compute nodes within a cluster may be the primary cause of congestion, but all initiators have their data traffic paused by the congestion.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
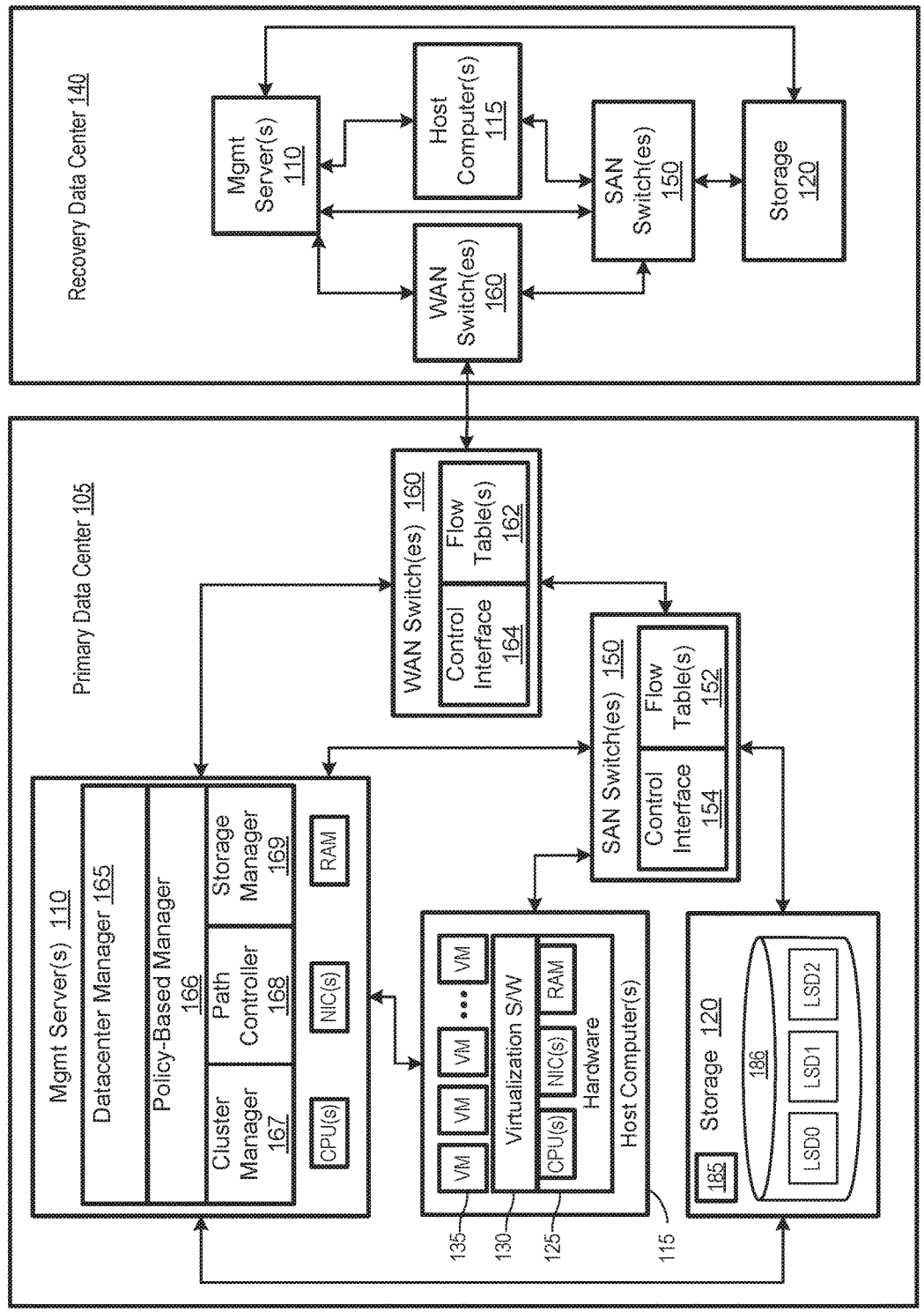
FIG. 1 illustrates, in block diagram form, an exemplary data center environment including one or more networked processing devices implementing the deployment of network nodes and the management of network traffic.

This document describes embodiments that include a management server receiving, from each of a plurality of switches, physical topology data of network nodes. The physical topology data includes identifiers of hosts connected to each of the switches and identifiers of storage connected to each of the switches. The management server transmits a query to each of the network nodes and receives, in response to each query, the capabilities of each network node. In one embodiment, each query and response is transmitted and received via an out-of-band connection between the management server and network node. In response to receiving a request to create a cluster of the hosts, the management server selects hosts and storage from the physical topology data to create the cluster. The hosts and storage are selected based upon the capabilities received from each network node. In one embodiment, the management server generates unique identifiers for the hosts and storage, as initiators and targets, and transmits the unique identifiers to the respective hosts and storage to set as their identifiers with one another using a storage protocol. In one embodiment, the management server uses the topology data and capabilities to determine logical paths between the selected hosts and the selected storage and transmits, to each of the switches, the determined logical paths to program flow tables within the switches. In one embodiment, the management server determines fabric or transport protocol login service parameters based upon the received storage capabilities and transmits the parameters to one or more of the plurality of switches, hosts, and storage. As a result, the management server eliminates a number of manual provisioning steps as well as the fabric and/or transport protocol login service parameter negotiation between network nodes.

This document also describes embodiments that include a management server receiving, from a switch, an indication of network congestion at the switch. The indication includes one or more contributors to the network congestion. For example, the contributors may be identified as individual data compute nodes or as an application provided by one or more data compute nodes. In one embodiment, the switch identifies one or more of the largest contributors to the congestion. In another embodiment, the switch identifies one or more contributors that contribute above a threshold amount of traffic to the congestion. In response to the indication of network congestion, the management server identifies one or more hosts running the identified contributor(s) and transmits an instruction to the host(s) to restrict network traffic originated by the contributor(s). For example, the restriction may include a reduction in the contributor's I/O queue depth. If the reduction in traffic does not remedy the congestion, the management server may receive a further indication of congestion and further instruct the host(s) to restrict identified contributor network traffic. For example, the contributors may have their I/O queue depth reduced exponentially until congestion is relieved. Upon receiving an indication that the congestion is relieved, the management server instructs the host(s) to remove the restriction on network traffic. As a result, the primary contributors to network congestion have their network traffic selectively throttled while other applications or data compute nodes are able to continue originating network traffic without restriction.

FIG. 1 illustrates, in block diagram form, exemplary data center environments including one or more networked processing devices implementing the deployment of network nodes and the management of network traffic. While the present description includes examples that reference data centers, embodiments are not limited to a particular scale of source and/or target sites. References to a data center may be used interchangeably with a physical computing site that, e.g., houses one or more host computer systems, storage devices, and associated networking components. References to network nodes include the hosts, switches, and storage that make up a data center.

In one embodiment, data center 105 represents a first data center site and data center 140 represents a second data center site. In one embodiment, data center site 105 and data center site 140 are geographically distinct sites for the purpose of disaster recovery. Data center 105 includes management server(s) 110, one or more host computers 115, and storage 120. One or more storage area network (SAN) switches 150 or similar switches couple hosts 115 to storage 120. One or more wide area network (WAN) switches 160 couple network nodes within data center 105 to recovery data center 140 as well as other external computers (not shown), via a WAN. Similarly, recovery data center 140 includes management server(s) 110, one or more host devices 115, storage 120, one or more SAN switches 150, and one or more WAN switches 160. In one embodiment, one or more of the illustrated switches are virtual switches implemented by one or more hosts 115. The network nodes illustrated within data center 140 may include one or more of the components illustrated in similarly referenced network nodes within data center 105. For the sake of simplicity, however, only the network nodes of data center 105 are illustrated with internal components.

Each host 115 includes hardware 125, virtualization software layer 130 (also referred to as a hypervisor), and virtual machines (VMs) 135. VMs 135 are complete computation environments, containing virtual equivalents of the hardware and system software components of a physical system and are typically implemented by an extensive virtualization infrastructure, which includes a variety of software and hardware components. For example, one or more of the VMs may implement virtual desktops. A virtual desktop is a virtual computing system that operates as a desktop or workstation computer with which an end user can interact using a desktop remoting protocol over a network. In one embodiment, one or more of the VMs implement a virtualized compute, networking, storage, or security service (e.g., a firewall, webserver, database server, etc.). In some embodiments, host 115 may include operating system level virtualization software containers such as those provided by companies such as Docker (www.docker.com). In other embodiments, host 115 includes both VMs and software containers.

Virtualization software layer 130 runs on hardware 125 of host 115 (e.g., a physical computer) and manages one or more VMs 135. Virtualization software layer 130 manages physical resources, e.g., hardware 125, as well as maintains virtual-to-physical hardware mappings. For example, virtualization software 130 may manage VM access to a processor, memory, or network interface within hardware 125 as well as a virtual disk or other logical storage device within underlying storage 120.

Hardware 125 includes one or more processors ("CPU(s)"), data storage and memory (e.g., "RAM"), and network interface controllers ("NIC(s)"). The data storage and memory may be used for storing data, metadata, and programs for execution by the processor(s). The data storage and memory may include one or more of volatile and non-volatile memories, such as Random Access Memory ("RAM"), Read Only Memory ("ROM"), a solid state disk ("SSD"), Flash, Phase Change Memory ("PCM"), or other types of data storage, such as magnetic disk drives, optical disk drives, etc. One or more buses (not shown) may be used to interconnect the various components of hardware 125.

Each of storage 120 includes one or more physical storage devices. In one embodiment, storage 120 includes storage controllers 185 to serve read and write requests and management commands/queries from host devices 115 and management servers 110. Each of storage 120 is partitioned into logical units, volumes, virtual volumes, and/or disks (which are collectively referred to herein as logical storage devices) that are stored on one or more of the physical storage devices. Each logical storage device is identified by a device identifier, e.g., a logical unit number (LUN), volume identifier, etc. For example, storage 120 is illustrated as including logical storage devices LSD0, LSD1, and LSD2 within array 186. Each of storage 120 may include additional arrays, logical storage devices, or other partitions of storage.

In one embodiment, primary data center 105 is configured to replicate data to recovery data center 140. For example, replication of data may be executed via host-based replication, network-based replication, or storage-based replication. In a network-based replication embodiment, a SAN switch 150 copies of data from VM I/O operations in transit to storage 120 and transmits the copies to recovery data center 140. For example, switch 150 inspects a received frame or packet to determine the originating VM 135 or application. Using flow table 152, SAN switch 150 maps the originating VM/application to the corresponding action— e.g., copy and forward. SAN switch 150 modifies the destination information in the copy of the traffic to insert destination information for storage 120 within recovery data center 140. Further according to flow table 152, switch 150 forwards the original frame/packet to storage 120 and transmits a copy of the frame/packet to recovery data center 140 via WAN switch(es) 160.

Management server(s) 110 includes data center manager 165. In one embodiment, data center manager 165 provides a management console for manual and automated control of hosts 115, VMs 135, SAN switches 150, WAN switches 160, and storage 120. For example, data center manager 165 provides a management console for provisioning, configuring, and maintaining VMs as virtual desktops or network services, managing pools of hosts 115 and storage 120 as a part of the cluster to run the VMs, etc.

In one embodiment, data center manger 165 includes or otherwise works cooperatively with policy-based manager 166. A service plan is an abstraction of resources, such as storage, hosts, VMs, switches/routers, etc., that are treated as a single entity based upon service-level characteristics. Operational and/or replication requirements, such as performance, availability, network throughput, storage capacity, data retention policy, recovery point objectives (RPOs), or other service-level characteristics, can be associated with service plans. For example, an administrator using policy-based manager 166 defines a service plan for one or more defined performance characteristics. Policy-based manager 166, automatically or in response to manual user selection, associates logical storage devices LSD0 and LSD1 with the protection service plan based upon LSD0 and LSD1 meeting threshold values for the performance characteristic(s). In one embodiment, a service-level characteristic is represented by a key-value pair, where the key is a specific property that the resource can offer and the value is a metric, or a range, that the resource guarantees. For example, storage performance capabilities include capacity, storage space reservation, failure tolerance, cache size, performance speed, availability, redundancy, etc. Networking device capabilities include bandwidth, throughput, etc. Host computer capabilities include capacity, cache size, performance speed, availability, application support, etc.

As another example, a VM may be included within or otherwise associated with a service plan based upon a requirement for a performance characteristic of another resource, such as a minimum storage capability of storage 120. To illustrate such an example, a storage administrator, application administrator, or end user for VM 135 uses policy-based manager 166 to create an association between VM 135 and a corresponding service plan. The administrator may associate a high-priority VM with a service plan that guarantees a high level of storage performance/reliability and low-priority VM with a service plan that does not guarantee such a high level of storage performance/reliability. In one embodiment, VMs, logical storage devices, or other data area associated with a service plan through the use of a tag stored in metadata and/or in a data structure maintained by the policy-based manager 166.

Management server(s) 110 further include cluster manager 167. A cluster is an aggregation of resources that are managed as a single entity. For example, cluster manager 167 may be used to select a group of one or more hosts 115 to add to a cluster as an aggregation of processing capability and memory. As described further below, hosts 115 or other network nodes may be automatically selected by cluster manager 167 in response to receiving a set of one or more requirements for the cluster. For example, an administrator may transmit a request to cluster manager 167 for the creation of a cluster to support 300 virtual desktops with particular minimum processing, storage, or other service-level characteristics. As each host is added to the cluster, the resources of that host becomes a part of the resources of the cluster. VMs deployed on a host within the cluster are a part of the cluster. Additionally, a cluster may include an aggregation of other resources. For example, cluster manager 167 may be used to select a group of storage 120 to add to a cluster as an aggregation of storage resources. In one embodiment, cluster manager 167 retrieves information about host capabilities and operational status from the hosts 115. For example, cluster manager 167 may communicate directly with hosts 115 via out-of-band connections between management server(s) 110 and hosts 115. In one embodiment, connections that carry application data and storage I/Os are referred to as "in-band" channels. Connections that carry metadata, control data/instructions, and other data between management server(s) 110 and network nodes to configure and/or control the network nodes are referred to as "out-of-band" connections. In one embodiment, out-of-band connections between network nodes and management server(s) 110 are channels dedicated to the management server control and configuration of the network nodes.

In managing the cluster, policies are applied to the cluster as a whole. For example, high-availability (HA) or disaster recovery policies may be applied to a cluster. HA allows one or more VMs running on a specific host within the cluster to be restarted automatically using other host resources in the cluster in the case of failure the specific host. Disaster recovery provides automatic initial VM placement and makes automatic resource relocation and optimization decisions as hosts are added or removed from the cluster or the load on individual VMs goes up or down.

Management server(s) 110 further include path controller 168. Path controller 168 determines and programs the path of traffic between network nodes. For example, path controller 168 uses network topology data and network node capabilities to determine and program flow tables 152 via control interface 154 within SAN switches 150. Similarly, path controller 168 programs flow tables 162 via control interface 164 within WAN switches 160. The flow tables map traffic by source, destination, application tag, or other information within the traffic data to how the switch is to handle the traffic, e.g., forward via a specific port, copy and forward, etc. In one embodiment, a switch forwards traffic not mapped by flow tables to path controller 168 and path controller 168 provides a response to the traffic or instruction to the switch as to how to handle the traffic. As an example, path controller 168 may implement an OpenFlow® controller or another software-defined networking protocol controller. In one embodiment, path controller 168 retrieves information about network topology, switch capabilities, and traffic status from the switches. For example, path controller 168 may communicate directly with switches via out-of-band connections between management server(s) 110 and switches 150 and switches 160.

In one embodiment, cluster manager 167 and/or path controller 168 include or otherwise work cooperatively with respective storage manager 169. In another embodiment, storage manager 169 is included within data center manager 165. Storage manager 169 retrieves information about storage topology, capabilities, and status from underlying storage 120. In one embodiment, storage manager 169 enables a cluster manager 167 and/or path controller 168 to send and receive vender-specific commands/messages to and from storage 120. For example, in order to provide uniform orchestration for device discovery, failover, synchronization, and test failover workflows across disparate storage arrays in the market, a storage/replication provider specification defines commands issued by a management server during the various workflows and the expected behavior of the storage arrays for these commands. Storage manager 169 translates the management server commands into vendor-specific commands. In one embodiment, storage manager 169 also maintains storage profile tag associations with logical storage devices and/or VMs. In one embodiment, storage manager 169 communicates directly with storage 120 via out-of-band connection(s) between management server(s) 110 and storage 120.

Similar to hosts 115, each of management servers 110 includes one or more processors ("CPU(s)"), data storage and memory (e.g., "RAM"), and network interface controllers ("NIC(s)"). The data storage and memory may be used for storing data, metadata, and programs for execution by the processor(s). The data storage and memory may include one or more of volatile and non-volatile memories, such as Random Access Memory ("RAM"), Read Only Memory ("ROM"), a solid state disk ("SSD"), Flash, Phase Change Memory ("PCM"), or other types of data storage, such as magnetic disk drives, optical disk drives, etc. One or more buses (not shown) may be used to interconnect the various components of this management server hardware. Additionally, each of datacenter manager 165, policy-based manager 166, cluster manager 167, path controller 168, and storage manager 169 may be implemented on a separate set of hardware, such as CPU(s), RAM, and NIC(s).

Figure 2:
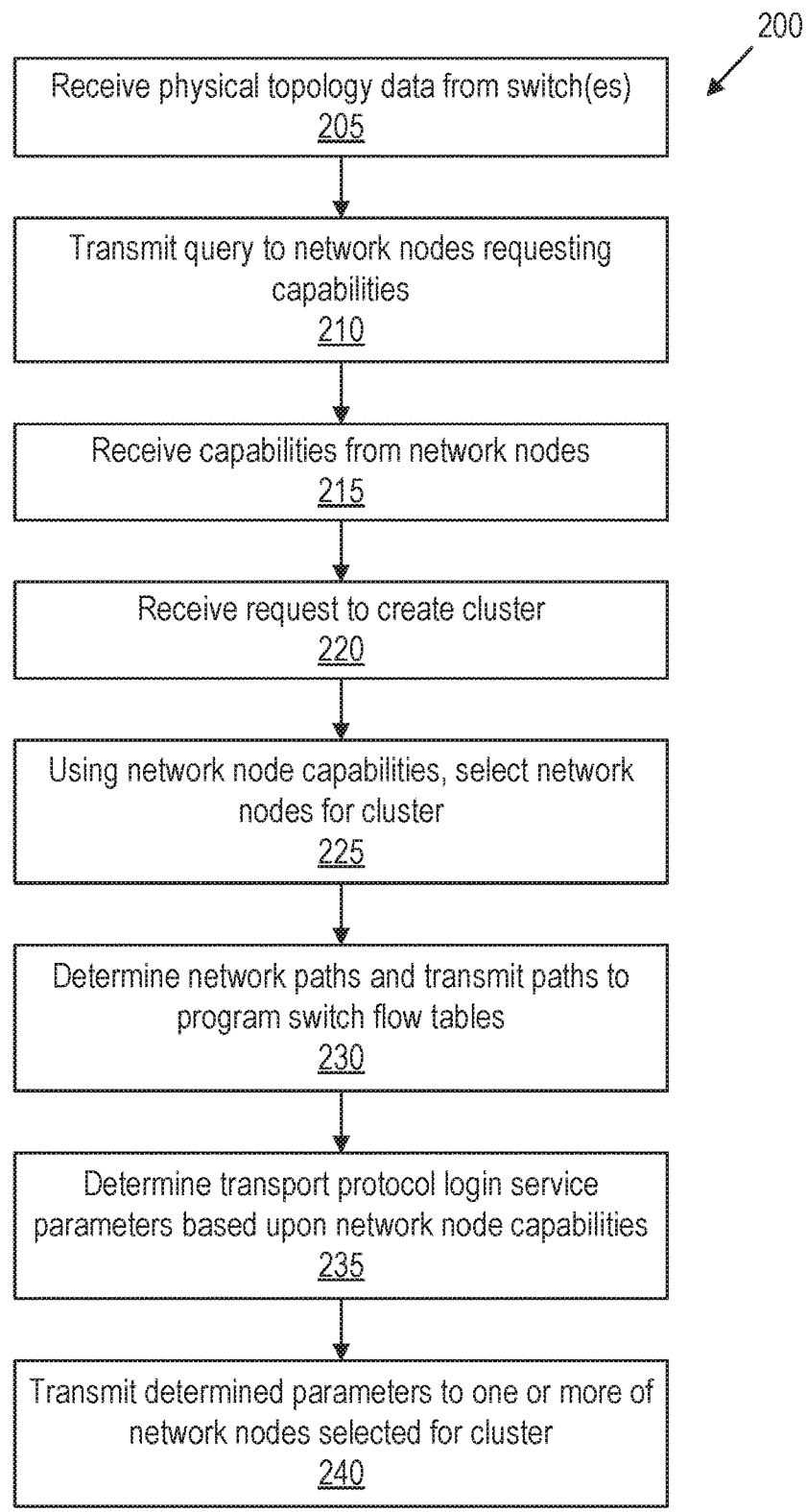
FIG. 2 is a flow chart illustrating an exemplary method of programming network nodes with network protocol parameters to enable communication between network nodes.

FIG. 2 is a flow chart illustrating exemplary method 200 of programming network nodes with network protocol parameters to enable communication between network nodes. At block 205, management server 110 receives topology data from one or more switches. For example, as a part of powering on, each host transmits link layer discovery protocol (LLDP) data to a switch to which it is coupled. The LLDP data includes a unique address or identifier for the host. Similarly, storage and switches also transmit link layer discovery data as a part of the discovery process. Each switch forwards the received LLDP data to management server 110 (e.g., to path controller 168). Management server 110 transmits a LLDP response to the switch and the switch forwards the response to the sender. As a result, management server 110 receives an indication of which network nodes (e.g., hosts, switches, and storage) are coupled to which are physically connected, or "neighbors," within the network. Using this data, management server 110 determines the physical topology of the local area network.

At block 210, management server 110 transmits a query to each of one or more network nodes within the local area network. The query includes a request for the capabilities of each network node. For example, management server 110 uses storage manager 169 to transmit a query to storage 120 to request the capabilities of each storage 120 coupled to management server. In one embodiment, the query is transmitted via an out-of-band connection between management server 110 and storage 120. In one embodiment, management server 110 also queries the capabilities of other network nodes. For example, management server 110 may query hosts 115 via cluster manager 167 to request each host's capabilities and query switches via path controller 168 to request each switches capabilities.

At block 215, management server 110 receives network node capabilities in response to each query. For example, each storage 120 may respond to the query with service-level characteristics including one or more of storage type, storage capacity, failure tolerance, cache size, performance speed, etc. Each host 115 may respond to the query with service-level characteristics including capacity, cache size, performance speed, availability, application support, etc. Each switch may respond to the query with service-level characteristics including bandwidth, throughput, etc. Additionally, network nodes may respond with fabric, transport, or other storage protocol login parameters. For example, the response may include port login (PLOGI) parameters such as buffer to buffer credit (indicating the number of buffers available at the transmission end), total concurrent sequences, open sequences per exchange, resource allocation time out value, error detect time out value, max data that can be received in a frame, support for continuously increasing offset, support for random relative offset, etc. Additionally or alternatively, the response may include process login (PRLI) parameters including an indication of whether mixing command and data is supported, transfer ready is enabled, retry method is supported, etc. In one embodiment, the response includes fabric login (FLOGI) parameters. In one embodiment, management server 110 stores the received capabilities in a table or other data structure mapping each network node to its capabilities.

At block 220, management server 110 receives a request to create a cluster. In one embodiment, the request includes one or more minimum service-level characteristics for the cluster. For example, an administrator transmits a request to deploy a particular number of virtual desktops or other applications with specific storage capacity and capabilities.

At block 225, using the received network node capabilities, management server 110 selects network nodes to create the cluster. For example, management server 110 parses the capabilities data structure and selects hosts 115 that meet or exceed the threshold service-level characteristics defined by the request to create the cluster. Similarly, management server 110 may parse the capabilities of storage 120 to select storage 120 that meet or exceed the threshold service-level characteristics defined by the request to create a storage pool for the cluster. In one embodiment, management server 110 also uses the determined network topology to select network nodes to create the cluster. For example, the service-level characteristics defined by the request may require that hosts 115 have redundant paths through different switches to reach storage 120 or meet a network round trip time or throughput value that is affected by the number of switches or types of switches between hosts 115 and storage 120.

At block 230, management server 110 determines network paths for the cluster. Using the determined physical topology of the network, management server 110 determines paths from selected hosts 115 to selected storage 120. In one embodiment, management server 110 selects the shortest path between each host 115 and storage 120 within the storage pool. In one embodiment, management server 110 selects paths based upon the network node capabilities. For example, management server 110 may select paths that include switches 150 that match the queue depth or other capabilities of hosts 115. Once paths have been determined, management server 110 transmits instructions to SAN switch(es) 150 and WAN switch(es) 160 to program the paths into the switch flow table(s) 152 and flow table(s) 162.

In one embodiment, the request to create the cluster includes a selection of disaster recovery or service plan, e.g., including network replication for particular VMs 135 or applications performed by VMs 135 or hosts 115. In such an embodiment, management server further programs one or more of the switches to execute network replication. For example, management server 110 determines a shortest path to a WAN switch 160 to select a SAN switch 150 in the path between a host 115 and storage 120 to replicate the traffic. Each VM I/O may be tagged by VM 135 or host 115 with one or more of an application tag, VM identifier, storage identifier, and service plan identifier. The switch flow table(s) may be programmed to map the application tag, VM identifier, storage identifier, and/or service plan identifier to an instruction to replicate the traffic. The instruction to replicate the traffic may include how to copy and forward the traffic to both the intended target and recovery data center 140. For example, the switch may modify the copied traffic to replace the local destination information with recovery data center 140 destination information.

At block 235, management server 110 determines fabric, transport, or other storage protocol login service parameters for the selected hosts 115, SAN switches 150, and storage 120. For example PLOGI and PLRI parameters received from hosts 115 and storage 120 are compared and management server 110 selects compatible values for those parameters in order for the selected hosts 115 and storage 120 to communicate. As a result, each host 115 does not need to attempt to negotiate these parameters as a part of the login process to establish a session with storage 120. In one embodiment, management server 110 creates or selects a unique initiator identifier for each host 115 and a unique target identifier for each storage 120 to further facilitate the communication between hosts 115 and storage 120. In one embodiment, FLOGI parameters received from hosts 115, SAN switches 150, and storage 120 are compared and management server 110 selects compatible values for those parameters in order for the selected hosts 115 and SAN switches 150 to communicate without negotiating fabric protocol parameters and for storage 120 and SAN switches 150 to communicate without negotiating fabric protocol parameters.

At block 240, management server 110 transmits the determined protocol parameters to the selected network nodes. Additionally, management server 110 may transmit the initiator or target identifier to each host 115 or storage 120. As discussed above, hosts 115 may bypass the negotiation of transport protocol login service parameters and, using the parameters and identifiers from management server 110, proceed directly to transmitting I/O requests to storage 120.

Figure 3:
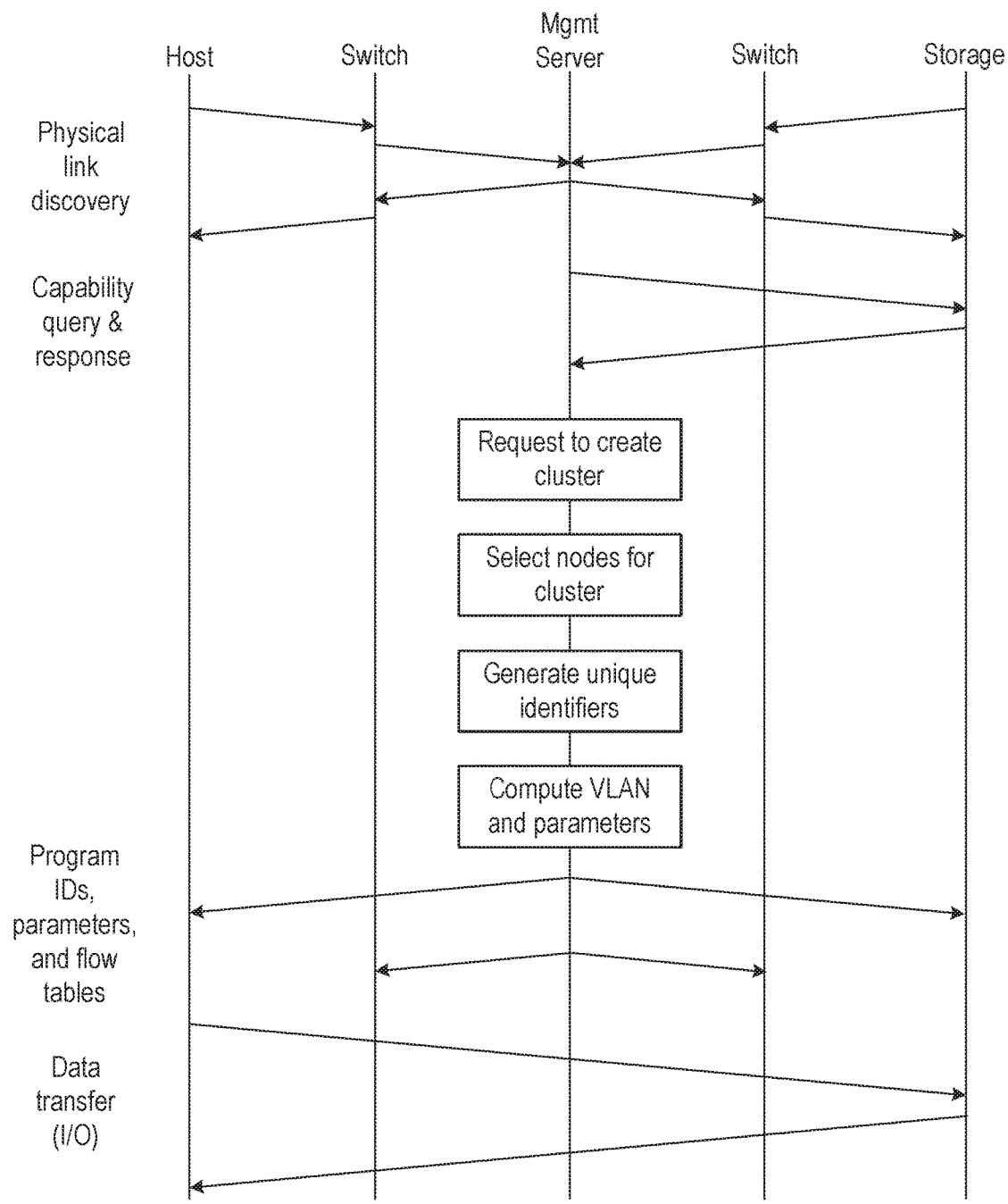
FIG. 3 is an exemplary exchange between network nodes in the deployment of a cluster and programming of network flow tables and protocol parameters.

FIG. 3 is an exemplary exchange between network nodes in the deployment of a cluster and programming of network flow tables and protocol parameters. As discussed with reference to FIG. 2, hosts 115 and storage 120 initiate physical or link layer discovery of network neighbors. For example, upon powering on, hosts 115 and storage 120 transmit an LLDP message to physically connected switches. The switches forward the messages to the management server. The management server stores the topology data and transmits LLDP responses to the switches. The switches forward the LLDP responses to the originating hosts 115 and storage 120. Management server 110 queries the capabilities of network nodes. For example, management server 110 transmits a query to each storage 120 and receives the corresponding response from each storage 120 as described above. In one embodiment, the query and response are transmitted via a direct or dedicated (i.e., out-of-band) connection between management server 110 and storage 120. Alternatively, the query and response are transmitted indirectly via one or more SAN switches 150. Similarly, management server 110 may query hosts 115 and/or the switches.

Upon determining the physical topology and capability of the network nodes, management server 110 may create a cluster and program the network nodes for communication with one another. For example, management server 110 receives a request to create a cluster and selects nodes for the cluster, based upon network node capabilities, that meet the requirements of the request. Management server 110 generates unique initiator identifiers for hosts 115 and target identifiers for storage 115, determines paths within the virtual local area network (VLAN), and determines the transport protocol login service parameters for the selected hosts 115 and storage 120.

Upon determining the configuration of the cluster and VLAN, management server 110 transmits the unique identifiers to hosts 115 and storage 120. Management server 110 further transmits the determined storage protocol login parameters to hosts 115 and storage 120. Additionally, management server transmits the determined paths to the switches 150 to program flow tables 152 and to switches 160 to program flow tables 162. As a result, hosts 115 may proceed directly to transmitting I/Os to storage 120 without negotiation of login parameters and the switches will have programmed flow tables to handle the route the I/O traffic between hosts 115 and storage 120.

Figure 4:
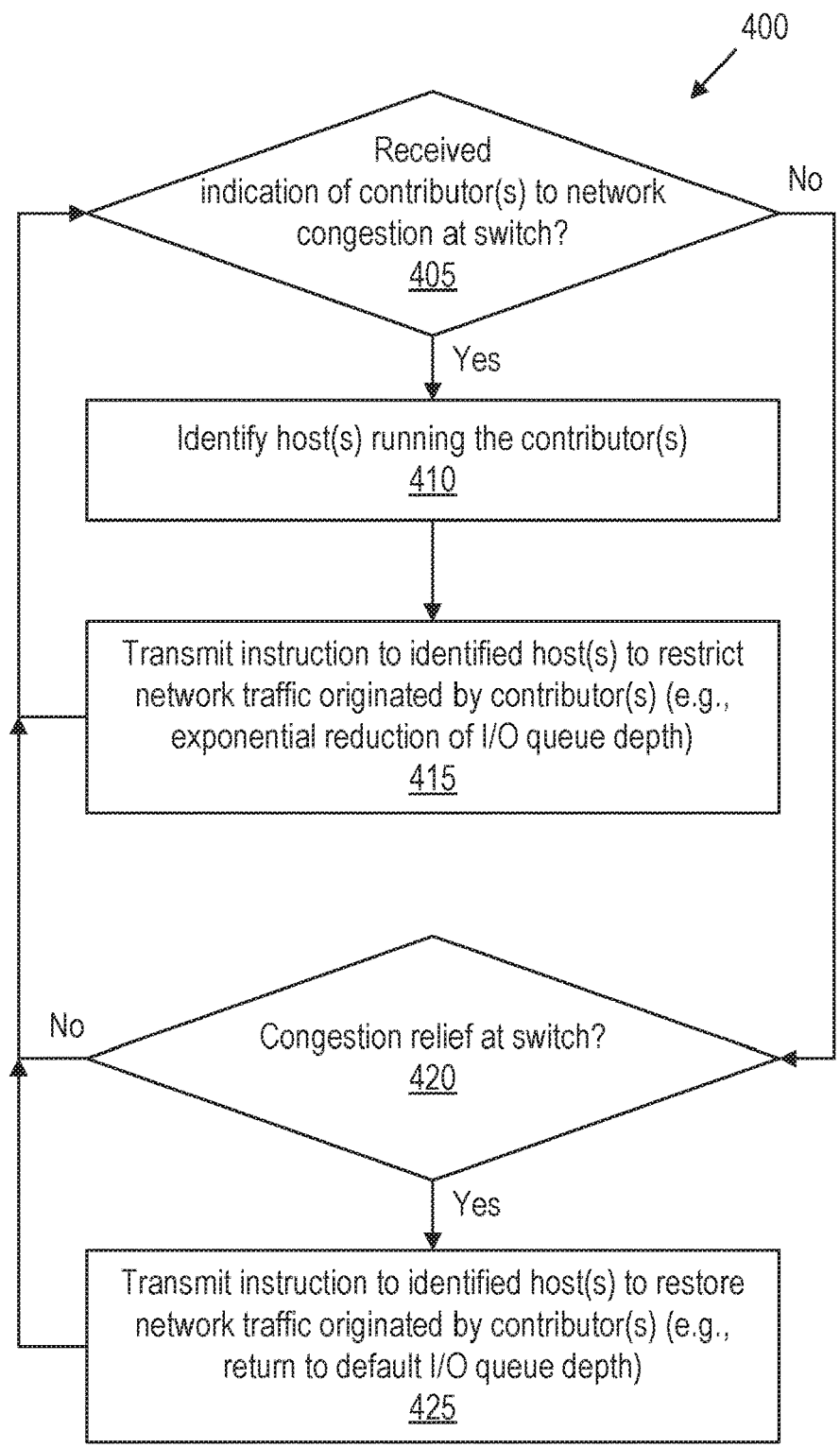
FIG. 4 is a flow chart illustrating an exemplary method of selectively throttling initiators in response to network congestion.

FIG. 4 is a flow chart illustrating exemplary method 400 of selectively throttling initiators in response to network congestion. At block 405, management server 110 determines if it has received an indication of one or more contributors to network congestion at a switch. For example, each VM I/O may be tagged by VM 135 or host 115 with an application tag, VM identifier, storage identifier, and/or service plan identifier. In one embodiment, WAN switch 160 exposes the free switch buffers to path controller 168 through an out-of-band channel. If WAN switch 160 becomes congested (i.e., the free buffer size is below a threshold value), WAN switch 160 retrieves one or more of application tags, VM or other traffic originator identifiers, and target information, and transmits and indication of congestion to management server 110, the indication of congestion including the retrieved tags, identifiers, or other information. In one embodiment, the switch transmits an indication of congestion with identifying information for the greatest contributor to the congestion. In another embodiment, the switch transmits an indication of congestion with identifying information for originators of traffic that contribute over a threshold amount of traffic to the congestion. In yet another embodiment, the switch transmits all identifying information and leaves it to management server 110 to determine the greatest contributor(s) or contributor(s) above a threshold amount of traffic.

If an indication of congestion is received, at block 410, management server 110 identifies the host(s) 115 running the greatest contributor(s) or contributor(s) above the threshold amount of traffic. For example, management server 110 maintains a table or other data structure mapping one or more of VM identifiers, application tags, and/or initiators that target particular storage 120 to hosts 115 that run the corresponding VMs 135, applications, or otherwise target particular storage 120.

At block 415, management server 110 transmits an instruction to each identified host 115 to selectively restrict traffic originator by the determined contributor(s). For example, instead of pausing all traffic directed to the switch until the congestion is relieved, management server 110 throttles the traffic of the greatest contributor to congestion or the one or more contributors that contribute above a threshold amount of traffic to the congestion. In one embodiment, the instruction to throttle traffic includes an instruction to reduce the I/O queue depth for the contributor. In one embodiment, management server 110 stores a list of contributor(s) and host(s) 115 instructed to throttle traffic to enable management server 110 to subsequently reverse the throttling when the congestion is relieved.

In one embodiment, management server 110 throttles traffic incrementally or exponentially. For example, management server 110 may instruct hosts 115 to reduce traffic from the determined contributors but does not completely stop contributor traffic at first. As method 400 returns to block 405, management server 110 determines if the congestion has been relieved. If not, management server 110 repeats blocks 405, 410, and 415 as described above and instructs host(s) 115 to further reduce traffic originated by the contributor(s). Each reduction may increase the total reduction in traffic incrementally or exponentially.

If an indication of congestion is not received, at block 420, management server 110 determines if the switch has recovered from the congestion. In one embodiment, the switch transmits an indication of congestion relief to management server 110. In another embodiment, management server 110 determines that the switch is no longer congestion if an indication of congestion has not been received for a threshold period of time. In one embodiment, management server 110 only determines if congestion has subsided when management server 110 previously received an indication of congestion and management server 110 has yet to receive an indication of or otherwise determined that the congestion has subsided.

If congestion has not subsided, method 400 returns to block 405. If congestion has subsided, at block 425, management server 110 transmits an instruction to the identified host(s) 115 to restore the network traffic flow from the contributor(s). In one embodiment, restoring the network traffic flow includes instructing host(s) 115 to increase the I/O queue depth for the contributor(s) to the value before throttling began. In one embodiment, the restoration of the network traffic flow is performed incrementally or in reverse of the exponential throttling described above. For example, the restoration of network traffic flow may include multiple instructions from management server to increase I/O queue depth in response to an indication of congestion relief and/or a continued lack of an indication of congestion.

Figure 5:
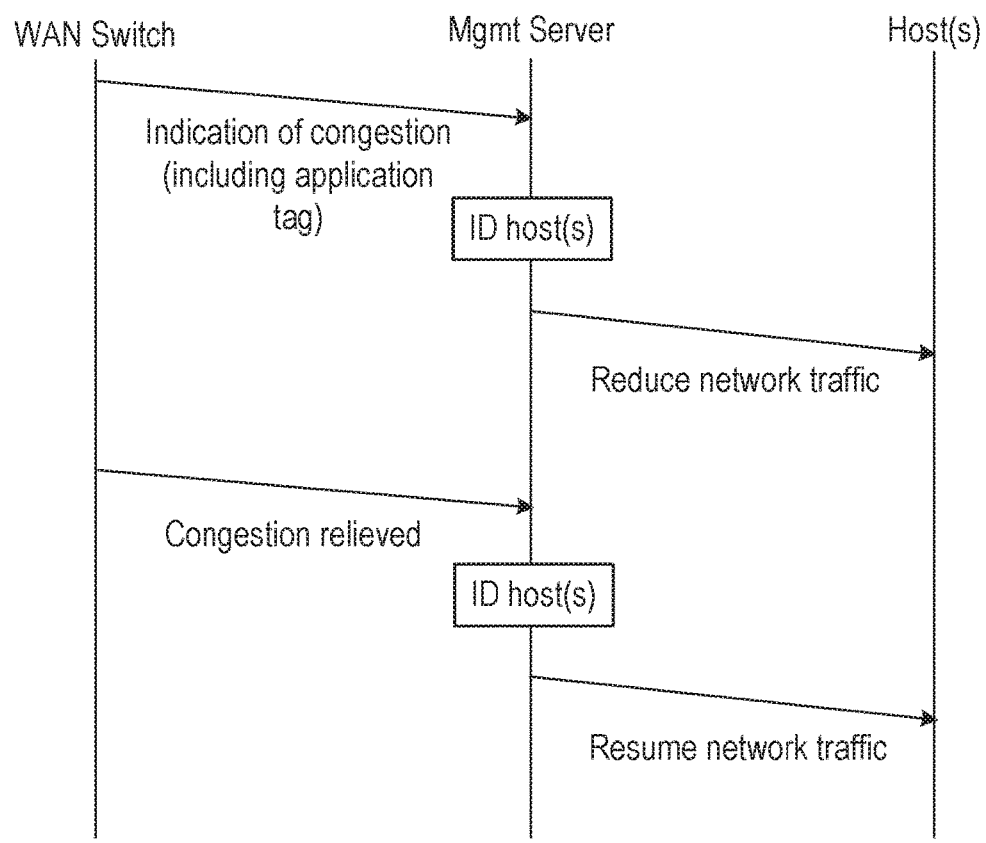
FIG. 5 is an exemplary exchange between network nodes in the selective throttling initiators in response to network congestion.

FIG. 5 is an exemplary exchange between network nodes in the selective throttling initiators in response to network congestion. As described above, WAN switch 160 transmits an indication of congestion including an application tag and/or other identifiers or information to management server 110. The indication of congestion enables management server 110 to map the tag, identifier(s), and/or other information to one or more hosts 115 running the contributors. Management server 110 transmits an instruction to the identified host(s) 115 to throttle traffic originated by the greatest contributor to the congestion or contributors above a threshold level of traffic (e.g., reduce I/O queue depth). These operations may repeat until the throttling reduces traffic to a level that results in congestion relief at WAN switch 160.

Once congestion is relieved at WAN switch 160, WAN switch 160 transmits an indication of congestion relief to management server 110. Management server 110 identifies the contributor(s) and host(s) 115 throttling traffic and transmits an instruction to the host(s) 115 to resume the flow of traffic (e.g., increase I/O queue depth).

It will be apparent from this description that aspects of the inventions may be embodied, at least in part, in software. That is, the computer-implemented methods 200 and 400 may be carried out in a computer system or other data processing system, such as one or more of management server(s) 110 (e.g., including datacenter manager 165, policy-based manager 166, cluster manager 167, path controller 168, and storage manager 169) in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. Thus, the techniques are not limited to any specific combination of hardware circuitry and software, or to any particular source for the instructions executed by a management server. It will also be appreciated that additional components, not shown, may also be part of the management server(s) 110 and hosts 115 illustrated in FIG. 1, and, in certain embodiments, fewer components than that shown in FIG. 1 may also be used.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards, solid state drives (SSD), or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention(s) have been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate virtualized resources or, in flow charts, optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
   receiving, from each of a plurality of switches, physical topology data of network nodes, the physical topology data including identifiers of a plurality of hosts connected to the plurality of switches and of a plurality of storage connected to plurality of switches;
   transmitting a query to each of a plurality of the network nodes to determine capabilities of each network node;
   receiving, in response to each query, the capabilities of each network node;
   receiving a request to create a cluster of one or more of the hosts and one or more of the storage, wherein the cluster is managed as a single entity, and wherein creating the cluster comprises;
      selecting hosts and storage from the physical topology data to create the cluster, wherein the selection is based upon the received capabilities and available paths defined by the physical topology data; and
      creating the cluster with the selected hosts and storage;
   determining transport protocol login service parameters for the selected hosts and storage based upon the received capabilities, the transport protocol login service parameters include compatible parameter values selected for parameters received from the selected hosts and storage such that the selected hosts and storage communicate without protocol negotiation between the respective hosts and storage; and
   configuring one or more of the plurality of switches and the selected hosts and storage to use the determined transport protocol login service parameters, wherein the configuring includes transmitting the determined transport protocol login service parameters to the one or more of the plurality of switches and the selected hosts and storage.

2. The computer-implemented method of claim 1, wherein the transport protocol login service parameters include fabric login parameters.

3. The computer-implemented method of claim 1, wherein the transport protocol login service parameters include port login parameters.

4. The computer-implemented method of claim 1, wherein the transport protocol login service parameters include process login parameters.

5. The computer-implemented method of claim 1, wherein each query is transmitted via an out-of-band connection to each network node.

6. The computer-implemented method of claim 1, wherein the received request includes a minimum storage capability, and wherein the selecting includes selecting hosts and storage that meet the minimum storage capability.

7. The computer-implemented method of claim 1, further comprising:
   determining logical paths between the selected hosts and the selected storage based upon physical topology data; and
   transmitting, to each of the switches, the determined logical paths to program flow tables within the switches.

8. The computer-implemented method of claim 1, further comprising:
   generating a first unique identifier for a first selected host as an initiator and a second unique identifier for a first selected storage as a target; and
   transmitting the first unique identifier to the one of the selected hosts and the second unique identifier for one of the selected storage to facilitate communication between the first host and the first storage.

9. The method of claim 1, wherein creating the cluster further comprises selecting a replication plan and transmitting instructions to one or more switches to execute network replication.

10. The method of claim 1, wherein determining the transport protocol login service parameters includes selecting parameter values such that the selected hosts and the switches communicate without negotiating fabric protocol parameter values between the hosts and switches.

11. A non-transitory computer-readable medium storing instructions, which when executed by a processing device, cause the processing device to perform a method comprising:
   receiving, from each of a plurality of switches, physical topology data of network nodes, the physical topology data including identifiers of a plurality of hosts connected to the plurality of switches and of a plurality of storage connected to plurality of switches;
   transmitting a query to each of a plurality of the network nodes to determine capabilities of each network node;
   receiving, in response to each query, the capabilities of each network node;
   receiving a request to create a cluster of one or more of the hosts and one or more of the storage, wherein the cluster is managed as a single entity, and wherein creating the cluster comprises:
      selecting hosts and storage from the physical topology data, wherein the selection is based upon the received capabilities; and creating the cluster with the selected hosts and storage;

determining transport protocol login service parameters for the selected hosts and storage based upon the received capabilities, the transport protocol login service parameters including compatible parameter values selected for parameters received from the selected hosts and storage such that the selected hosts and storage communicate without protocol negotiation between the respective hosts and storage; and configuring one or more of the plurality of switches and the selected hosts and storage to use the determined transport protocol login service parameters, wherein the configuring includes transmitting the determined transport protocol login service parameters to the one or more of the plurality of switches and the selected hosts and storage.

12. The non-transitory computer-readable medium of claim 11, wherein the transport protocol login service parameters include fabric login parameters.

13. The non-transitory computer-readable medium of claim 11, wherein the transport protocol login service parameters include port login parameters.

14. The non-transitory computer-readable medium of claim 11, wherein the transport protocol login service parameters include process login parameters.

15. The non-transitory computer-readable medium of claim 11, wherein each query is transmitted via an out-of-band connection to each network node.

16. The non-transitory computer-readable medium of claim 11, wherein the received request includes a minimum storage capability, and wherein the selecting includes selecting hosts and storage that meet the minimum storage capability.

17. The non-transitory computer-readable medium of claim 11, the method further comprising:
   determining logical paths between the selected hosts and the selected storage based upon physical topology data; and
   transmitting, to each of the switches, the determined logical paths to program flow tables within the switches.

18. The non-transitory computer-readable medium of claim 11, the method further comprising:
   generating a first unique identifier for a first selected host as an initiator and a second unique identifier for a first selected storage as a target; and
   transmitting the first unique identifier to the one of the selected hosts and the second unique identifier for one of the selected storage to facilitate communication between the first host and the first storage.

19. A management server comprising:
   a processing device; and
   a memory coupled to the processing device, the memory storing instructions which, when executed by the processing device, cause the management server to:
      receive, from each of a plurality of switches, physical topology data of network nodes, the physical topology data including identifiers of a plurality of hosts connected to the plurality of switches and of a plurality of storage connected to plurality of switches;
      transmit a query to each of a plurality of the network nodes to determine capabilities of each network node;
      receive, in response to each query, the capabilities of each network node;
      receive a request to create a cluster of one or more of the hosts and one or more of the storage, wherein the cluster is managed as a single entity, and wherein creating the cluster comprises;
         selecting hosts and storage from the physical topology data, wherein the selection is based upon the received capabilities and available paths defined by the physical topology data; and
         creating the cluster with the selected hosts and storage;
      determine transport protocol login service parameters for the selected hosts and storage based upon the received capabilities, the transport protocol login service parameters including compatible parameter values selected for parameters received from the selected hosts and storage such that the selected hosts and storage communicate without protocol negotiation between the respective hosts and storage; and
      configure one or more of the plurality of switches and the selected hosts and storage to use the determined transport protocol login service parameters, wherein the configuring includes transmitting the determined transport protocol login service parameters to the one or more of the plurality of switches and the selected hosts and storage.

20. The management server of claim 19, wherein the transport protocol login service parameters include fabric login parameters.

21. The management server of claim 19, wherein the transport protocol login service parameters include port login parameters.

22. The management server of claim 19, wherein the transport protocol login service parameters include process login parameters.

* * * * *